(12) United States Patent
Mihaltan et al.

(10) Patent No.: US 11,107,308 B2
(45) Date of Patent: Aug. 31, 2021

(54) AUTOMATED HARDWARE-IN-THE-LOOP TESTER FOR AUTOMOTIVE ELECTRONIC CONTROL UNITS

(71) Applicant: DENSO International America, Inc., Southfield, MI (US)

(72) Inventors: Sorin Mihaltan, Livonia, MI (US); Jonathan Swierczynski, St. Clair Shores, MI (US); Jeffrey Berg, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 243 days.

(21) Appl. No.: 16/110,383

(22) Filed: Aug. 23, 2018

(65) Prior Publication Data

US 2019/0244444 A1    Aug. 8, 2019

Related U.S. Application Data

(60) Provisional application No. 62/625,566, filed on Feb. 2, 2018.

(51) Int. Cl.
| | | |
|---|---|---|
| *G07C 5/08* | (2006.01) | |
| *G07C 5/12* | (2006.01) | |
| *G07C 5/00* | (2006.01) | |
| *G01M 15/00* | (2006.01) | |

(52) U.S. Cl.
CPC ........... *G07C 5/0808* (2013.01); *G01M 15/00* (2013.01); *G07C 5/008* (2013.01); *G07C 5/12* (2013.01)

(58) Field of Classification Search
CPC ........ G07C 5/0808; G07C 5/008; G07C 5/12; G01M 15/00; G06F 11/26
See application file for complete search history.

(56) References Cited

U.S. PATENT DOCUMENTS

| | | | | |
|---|---|---|---|---|
| 4,692,299 A | * | 9/1987 | Crew ................. | G05B 23/0256 376/216 |
| 5,463,559 A | * | 10/1995 | Kirkpatrick .............. | G05B 9/02 702/183 |
| 5,563,788 A | * | 10/1996 | Yoon ................... | B60R 16/0231 701/33.4 |
| 5,815,511 A | * | 9/1998 | Yamamoto ....... | G01R 31/31701 714/43 |

(Continued)

*Primary Examiner* — Thomas E Worden
(74) *Attorney, Agent, or Firm* — Harness, Dickey & Pierce, P.L.C.

(57) ABSTRACT

Systems and methods for an automated hardware-in-the-loop tester are disclosed and include a processor configured to execute instructions stored in a nontransitory computer-readable medium. The instructions include executing an executable object, which includes identifying a first circuit from at least one circuit based on the executable object. The instructions include, in response to identifying the first circuit, controlling a first signal transmitted from the first circuit to an electronic control unit (ECU). The first signal represents one of (i) a signal transmitted by a vehicle and (ii) a signal received from a communications system. While transmitting the first signal, the instructions include generating a first set of data that indicates operating characteristics of the ECU in response to receiving the first signal. The instructions include generating a report based on the first set of data.

10 Claims, 6 Drawing Sheets

(56) References Cited

U.S. PATENT DOCUMENTS

| | | | | |
|---|---|---|---|---|
| 6,182,245 B1* | 1/2001 | Akin | ................... | G06F 11/3672 |
| | | | | 711/100 |
| 6,564,128 B2* | 5/2003 | Baird | ..................... | G07C 5/008 |
| | | | | 701/31.5 |
| 6,804,796 B2* | 10/2004 | Gustavsson | ......... | G06F 11/3692 |
| | | | | 714/38.1 |
| 6,968,427 B1* | 11/2005 | Yee | ..................... | G06F 12/0895 |
| | | | | 711/118 |
| 7,313,035 B2* | 12/2007 | Lynch | ................. | G06F 13/1673 |
| | | | | 365/189.11 |
| 8,612,192 B2* | 12/2013 | Larsson | ................. | G05B 17/02 |
| | | | | 703/8 |
| 2005/0128823 A1* | 6/2005 | Lynch | ................... | G11C 7/1036 |
| | | | | 365/189.12 |
| 2006/0150033 A1* | 7/2006 | Kolb | ................... | G06F 11/1497 |
| | | | | 714/47.2 |
| 2007/0174751 A1* | 7/2007 | Sulzer | .................... | G06F 11/26 |
| | | | | 714/735 |
| 2011/0288840 A1* | 11/2011 | Kropinski | ............... | G06F 30/20 |
| | | | | 703/8 |
| 2012/0159251 A1* | 6/2012 | Wu | ......................... | G06F 11/27 |
| | | | | 714/30 |
| 2013/0305031 A1* | 11/2013 | Nitta | ....................... | G06F 9/441 |
| | | | | 713/100 |
| 2016/0181967 A1* | 6/2016 | Nojima | .................. | H02P 31/00 |
| | | | | 700/286 |
| 2020/0342846 A1* | 10/2020 | Cai | ......................... | H04S 7/304 |

* cited by examiner

AUTOMATED HARDWARE-IN-THE-LOOP TESTER FOR AUTOMOTIVE ELECTRONIC CONTROL UNITS

CROSS-REFERENCE TO RELATED APPLICATIONS

This application claims the benefit of U.S. Provisional Application No. 62/625,566, filed on Feb. 2, 2018. The entire disclosure of the above application is incorporated herein by reference.

FIELD

The present disclosure relates to systems and methods for testing automotive electronic control units.

BACKGROUND

This section provides background information related to the present disclosure and is not necessarily prior art.

Using a test bench that simulates vehicle connections and a vehicular environment, automotive suppliers may test the safety and functionality of its manufactured devices. As an example, a technician of an automotive supplier may manually and directly control signals transmitted from the test bench to a device under test (DUT), such as an electronic control unit (ECU), in order to evaluate how the DUT responds to receiving power from a vehicle battery. As another example, the technician may manually and directly control signals transmitted from the test bench to the DUT in order to evaluate connections between the DUT and various other components of the vehicle and the DUT's behavior as a result of these signals.

A data communications module (DCM), which may also be referred to as a telematics communication unit (TCU) and is configured to provide various telematics services to an operator of the vehicle, must be tested in both lab and actual driving conditions to ensure that the DCM is properly functioning. The various telematics services provided by the DCM, such as voice, data, and SMS connectivity, must be operable with all wireless operators that the data communications module may connect to. As an example, the DCM operating on a US cellular network must also operate on a Canadian cellular network, a Puerto Rican cellular network, etc. As such, in order to test the operability of the DCMs on each of the networks, the technician must travel to locations where the network is available and manually execute the testing procedures. Accordingly, the technician may need to travel to these locations multiple times in order to complete all testing procedures for the DCM. Furthermore, unpredictability of the network and variability in executing the various test functions of the test bench may cause variable and unreliable determinations regarding the functionality and safety of the DCM, thus requiring repeated testing at the remote locations.

SUMMARY

This section provides a general summary of the disclosure, and is not a comprehensive disclosure of its full scope or all of its features.

A system is disclosed and includes a processor configured to execute instructions stored in a nontransitory computer-readable medium, wherein the instructions include executing, using the processor, an executable object. Executing the executable object comprises identifying, using the processor, a first circuit from at least one circuit based on the executable object. Executing the executable object comprises, in response to identifying the first circuit, controlling, using the processor, a first signal transmitted from the first circuit to an electronic control unit (ECU), wherein the first signal represents one of (i) a signal transmitted by a vehicle and (ii) a signal received from a communications system. Executing the executable object also comprises, while transmitting the first signal, generating, using the processor, a first set of data, wherein the first set of data indicates operating characteristics of the ECU in response to receiving the first signal. Executing the executable object also comprises generating, using the processor, a report based on the first set of data.

In some configurations, executing the executable object comprises identifying, using the processor, a second circuit from the at least one circuit based on the executable object. Executing the executable object also comprises, in response to identifying the second circuit, controlling, using the processor, a second signal transmitted from the second circuit to the ECU, wherein the second signal represents one of (i) a signal transmitted by the vehicle and (ii) a signal received from the communications system. Executing the executable object also comprises, while transmitting the second signal, generating, using the processor, a second set of data, wherein the second set of data indicates operating characteristics of the ECU in response to receiving the second signal. Executing the executable object also comprises generating, using the processor, the report based on the first set of data and the second set of data.

In some configurations, identifying the first circuit from the at least one circuit further comprises receiving, using the processor, an input on a graphical user interface (GUI) corresponding to a selection of the first circuit.

In some configurations, the input is generated by a first executable object that is configured to, in response to being executed, execute an automated testing procedure.

In some configurations, the input is generated by an operator of a computing device, and wherein the computing device includes the processor.

In some configurations, the executable object is one of a script and a command.

In some configurations, the ECU is a data communications module configured to execute telematics operations.

In some configurations, the first circuit includes one of a relay, a field programmable gate array (FPGA), and a peripheral component interconnect express (PCIe) card.

In some configurations, the first circuit includes one of a programmable logic device (PLD), a radio frequency attenuator circuit, an audio circuit, and a universal serial bus (USB) interface circuit.

In some configurations, executing the executable object further comprises transmitting, using the processor, the report to a remote server.

A method is disclosed and includes executing, using a processor configured to execute instructions stored in a nontransitory computer-readable medium, an executable object. Executing the executable object comprises identifying, using the processor, a first circuit from at least one circuit based on the executable object. Executing the executable object comprises, in response to identifying the first circuit, controlling, using the processor, a first signal transmitted from the first circuit to an electronic control unit (ECU), wherein the first signal represents one of (i) a signal transmitted by a vehicle and (ii) a signal received from a communications system. Executing the executable object also comprises, while transmitting the first signal, generating, using the processor, a first set of data, wherein the first set of data indicates operating characteristics of the ECU in response to receiving the first signal. Executing the executable object also comprises generating, using the processor, a report based on the first set of data.

In some configurations, executing the executable object comprises identifying, using the processor, a second circuit from the at least one circuit based on the executable object. Executing the executable object also comprises, in response to identifying the second circuit, controlling, using the processor, a second signal transmitted from the second circuit to the ECU, wherein the second signal represents one of (i) a signal transmitted by the vehicle and (ii) a signal received from the communications system. Executing the executable object also comprises, while transmitting the second signal, generating, using the processor, a second set of data, wherein the second set of data indicates operating characteristics of the ECU in response to receiving the second signal. Executing the executable object also comprises generating, using the processor, the report based on the first set of data and the second set of data.

In some configurations, identifying the first circuit from the at least one circuit further comprises receiving, using the processor, an input on a graphical user interface (GUI) corresponding to a selection of the first circuit.

In some configurations, the input is generated by a first executable object that is configured to, in response to being executed, execute an automated testing procedure.

In some configurations, the input is generated by an operator of a computing device, and wherein the computing device includes the processor.

In some configurations, the executable object is one of a script and a command.

In some configurations, the ECU is a data communications module configured to execute telematics operations.

In some configurations, the first circuit includes one of a relay, a field programmable gate array (FPGA), and a peripheral component interconnect express (PCIe) card.

In some configurations, the first circuit includes one of a programmable logic device (PLD), a radio frequency attenuator circuit, an audio circuit, and a universal serial bus (USB) interface circuit.

In some configurations, executing the executable object further comprises transmitting, using the processor, the report to a remote server.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
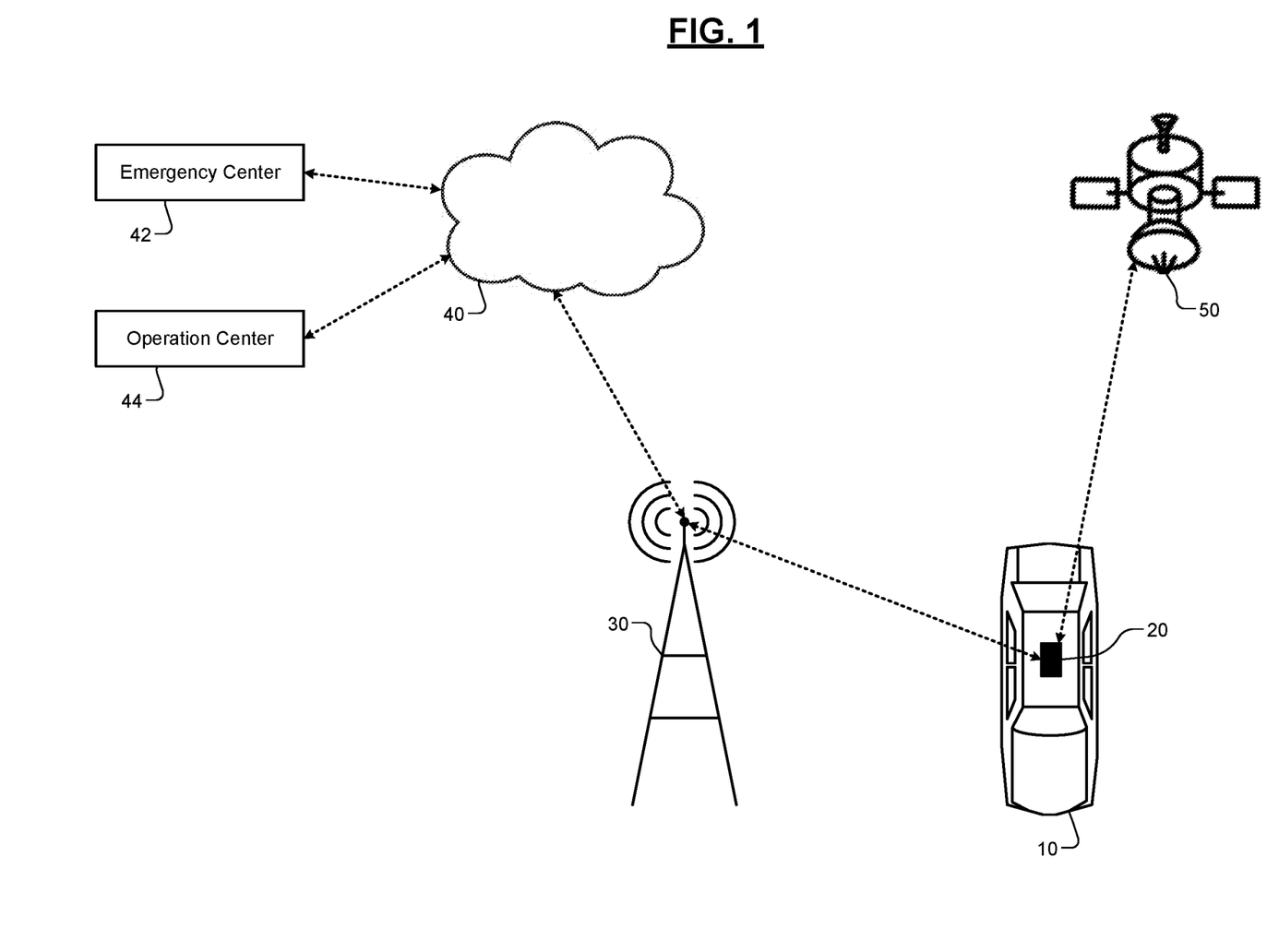
FIG. 1 illustrates an example data communication module of a vehicle according to the present disclosure.

With reference to FIG. 1, a vehicle 10 equipped with a data communications module (DCM) 20 is shown. The DCM 20 is configured to provide various telematics services for an operator of the vehicle 10 by connecting to internet 40 via a cellular tower 30 of a cellular network. As an example, the telematics services may include an emergency call system that is configured to automatically notify an authority, such as an emergency center 42 and/or an operation center 44, when the vehicle 10 is involved in an accident or other emergency. In addition to notifying the authority of the accident or other emergency, the emergency call system may be configured to transmit location information obtained from a global navigation satellite system (GNSS) satellite 50 (e.g., a GPS satellite) to the authority in order to assist the authority in locating the vehicle 10.

As another example, the telematics services may also include transmitting vehicle diagnostics obtained by an electronic control unit (ECU) of the vehicle 10 to a remote server via the cellular tower 30 and the internet 40. In response to transmitting the vehicle diagnostics, the DCM 20 may receive information corresponding to corrective actions and/or alerts, which are subsequently presented to the operator of the vehicle 10 via an instrument cluster or other display device of the vehicle 10. Additionally, the telematics services may also include providing a gateway for infotainment systems. Specifically, the DCM 20 may provide a gateway for entertainment information provided by the internet 40. As another example, the telematics services may also include enabling the DCM 20 to provide a Wi-Fi hotspot, thereby allowing mobile devices to connect to the internet 40 via the DCM 20.

Additionally, the telematics services may also include vehicle theft tracking services. If the operator determines and communicates to the authority that the vehicle 10 was stolen, the authority may obtain the location information obtained by the GNSS satellite 50 and the DCM 20 via the cellular tower 30 and the internet 40. Accordingly, the authority may subsequently locate the vehicle 10 based on the location information and take any necessary remedial measures. While these are merely examples of the telematics services, the various telematics services that the DCM 20 may provide are not limited to the examples described above.

In order to execute the telematics services, the DCM 20 may include cellular transceiver system(s) that enable the DCM 20 to communicate over various cellular network systems (e.g., 2G, 3G, 4G, LTE, 5G, etc.). Furthermore, the DCM 20 may also include a GNSS transceiver system, which may include GNSS antennas, GNSS filters, GNSS amplifiers, GNSS radios, etc. Additionally, the DCM 20 may also include various interfaces that enable the vehicle 10 to transmit and receive information with various devices (e.g., audio interfaces, USB interfaces, serial communication interfaces, controller area network (CAN) interfaces, ECU interfaces, etc.).

Figure 2A:
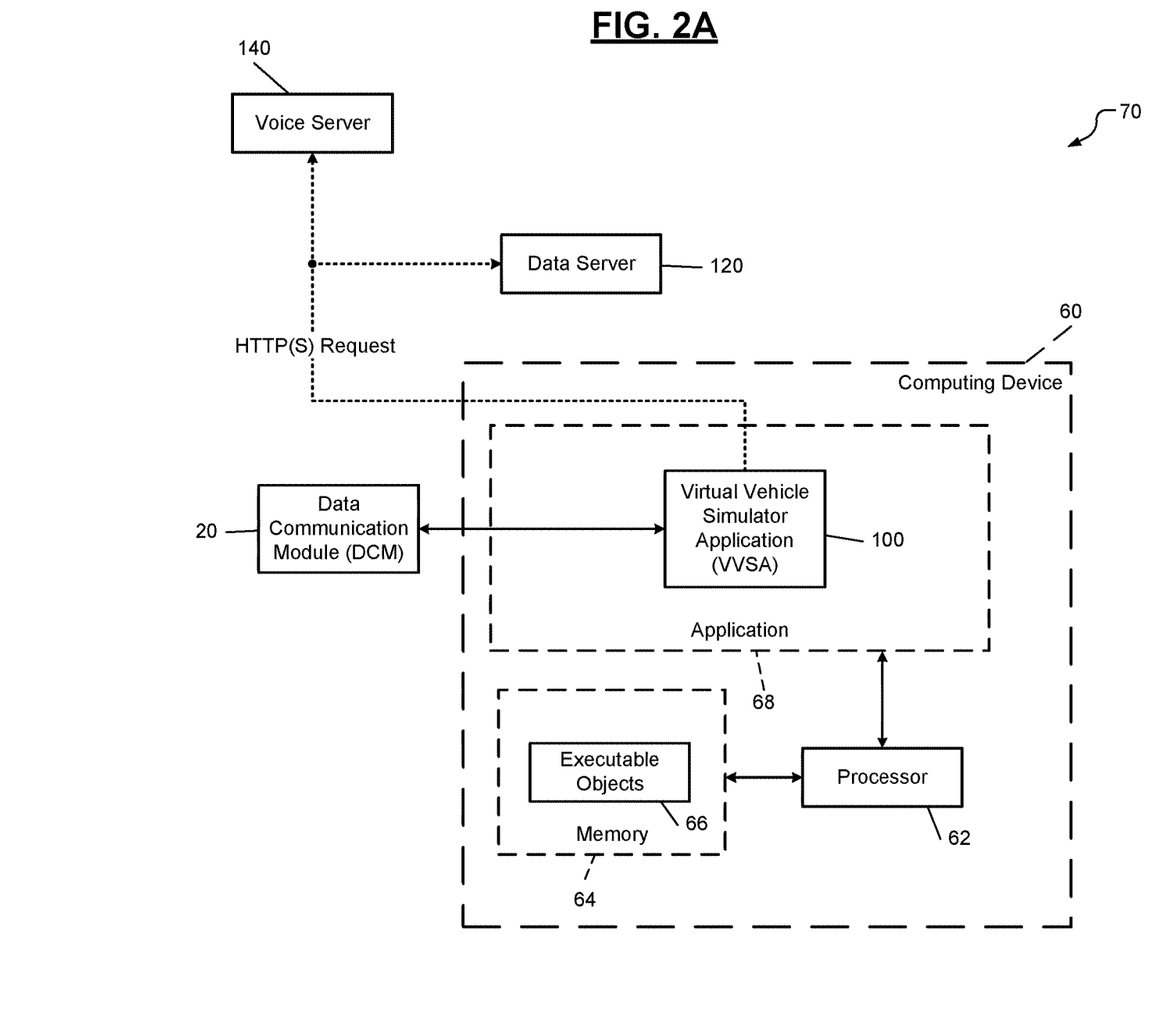
FIGS. 2A-2B illustrate high-level functional block diagrams of a system configured to test a data communication module of a vehicle according to the present disclosure.

With reference to FIG. 2A, an illustration of a high-level functional block diagram of a DCM test bench system 70 that is configured to test the DCM 20 is shown. The DCM test bench system 70 includes the DCM 20, a computing device 60, a data server 120, and a voice server 140. The computing device 60 may be implemented by, for example, a computer, laptop, smartphone, PDA, or other similar device. The computing device 60 includes a processor 62 that is configured to carry out the functionality described herein. In order to carry out the functionality, the processor 62 may execute instructions stored in a memory 64, which may be implemented by a nontransitory computer-readable medium, such as a random-access memory (RAM) and/or a read-only memory (ROM).

In order to test the DCM 20, the computing device 60 may initiate an application 68, which is configured to execute executable objects 66 stored in the memory 64. As described herein, the executable objects 66 are computer programs that include source code for execution by an interpreter, such as a script. In other embodiments, the computer programs may include source code for compilation and execution by a just-in-time (JIT) compiler, and the source code may include syntax from various programming languages, such as C, C++, etc.

In response to executing at least one of the executable objects 66, the application 68 is configured to initiate a virtual vehicle simulator application (VVSA) 100. The VVSA 100 provides an interface for allowing an operator of the DCM test bench system 70 to manually control signals transmitted from a plurality of hardware devices (shown in FIG. 3) to the DCM 20, and the manually controlled signals may represent or simulate signals transmitted by the vehicle 10. As such, the VVSA 100 may remotely test the functionality and safety of the DCM 20 and remotely identify or reproduce software errors of the DCM 20, thereby improving the efficiency of the testing procedure. The interface of the VVSA 100 may be implemented by a graphical user interface (GUI) that includes a plurality of graphical elements for manually controlling the signals transmitted from the plurality of hardware devices to the DCM 20. The VVSA 100 and the hardware devices are described below in further detail with reference to FIG. 3.

While manually controlling the signals transmitted from the plurality of hardware devices to the DCM 20, the VVSA 100 may be configured to transmit information representing the operating characteristics and/or response of the DCM 20 to the data server 120 and the voice server 140. While this embodiment illustrates two remote servers, in other embodiments, the data server 120 and the voice server 140 may be implemented by a single remote server. The data server 120 may be a remote test server that is configured to receive a hypertext transfer protocol (HTTP) request or HTTP secure (HTTPS) request from the VVSA 100 with data corresponding to the operational characteristics and/or identifying information of the DCM 20. Additionally or alternatively, the data server 120 may be configured to receive data using any other suitable protocol, such as a transmission control protocol (TCP). The voice server 140 may be a remote server that is configured to receive an HTTP request from the VVSA 100 with data corresponding to the voice call characteristics and/or other relevant voice call information. In response to receiving the HTTP requests, the data server 120 and the voice server 140 are configured to generate an acknowledgement (ACK) indicating successful receipt of the HTTP requests. By transmitting HTTP requests from the VVSA 100 to the data server 120 and the voice server 140, the VVSA 100 may determine whether the DCM 20 is properly configured to transmit voice calls and other operational data of the DCM 20 to the emergency center 42 and the operation center 44 via the internet 40, as shown in FIG. 1.

Figure 2B:
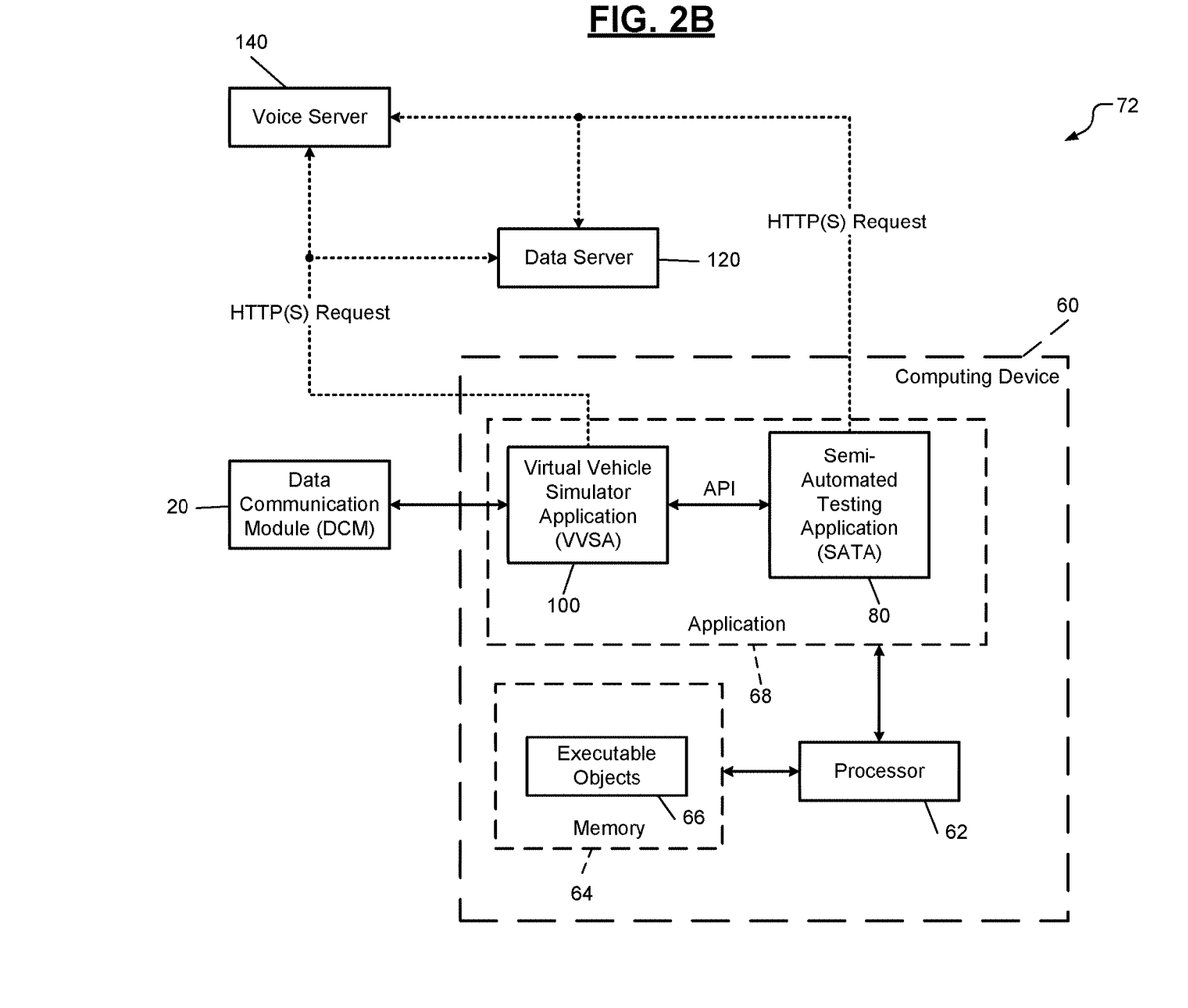

With reference to FIG. 2B, an illustration of a high-level functional block diagram of a DCM test bench system 72 that is configured to test the DCM 20 is shown. The DCM test bench system 72 is similar to the DCM test bench system 70, but in this embodiment, the application 68 is configured to initiate a semi-automated testing application (SATA) 80 in response to executing at least one of the executable objects 66. The SATA 80 provides an application program interface (API) for allowing an operator of the DCM test bench system 72 to interface with multiple applications, such as the VVSA 100. Furthermore, using the SATA 80, an operator may be able to execute automated algorithms for controlling signals transmitted from the plurality of hardware devices to the DCM 20. As an example, the SATA 80 may execute one of the executable objects 66. In response to executing one of the executable objects 66, the SATA 80 may automatically control the signals transmitted from one of the hardware devices without requiring the operator to select a graphical element of the GUI of the VVSA 100. The SATA 80 is described below in further detail with reference to FIG. 3.

As such, the SATA 80 enables the operator to perform multiple iterations of a testing algorithm corresponding to the functionality and safety of the DCM 20. Additionally, the SATA 80 enables an operator who is not familiar with the syntax of the executable objects 66 to perform multiple iterations of a test algorithm by loading and initiating one of the executable objects 66 using the GUI of the SATA 80. Furthermore, the SATA 80 provides consistent order and timing of test execution regardless of who is testing the DCM 20, thereby enabling software developers to readily understand the testing algorithm implemented and identifying and/or reproducing software errors by reviewing the syntax of the corresponding executable objects 66.

Figure 3:
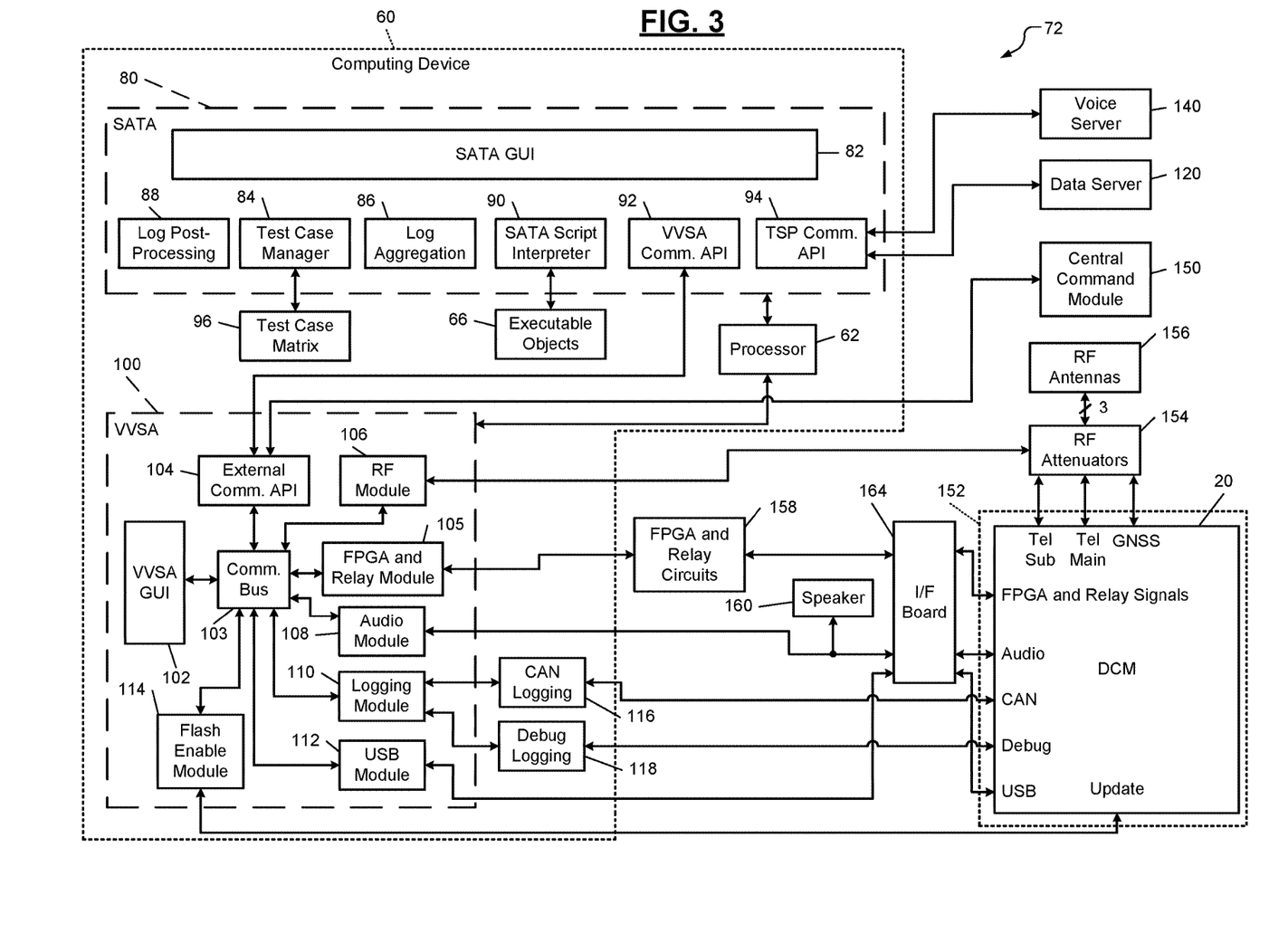
FIG. 3 illustrates a detailed functional block diagram of a system configured to test the data communication module of the vehicle according to the present disclosure.

With reference to FIG. 3, a detailed functional block diagram of the DCM test bench system 72 is shown. As described above, the computing device 60 of the DCM test bench system 72 includes the SATA 80 and the VVSA 100. The SATA 80 includes a SATA GUI 82, a test case manager module 84, a log aggregation module 86, a log post-processing module 88, a SATA script interpreter 90, a VVSA communication API 92, and a telematics service protocol (TSP) communication API 94. The SATA GUI 82 is configured to provide an interface that enables the operator to automatically control the execution of the executable objects 66 and display the results of the executed executable objects 66. The test case manager module 84 is configured to execute a script from a test case matrix 96. In response to executing the script, the test case manager module 84 may be configured to validate the functionality of the SATA 80. The log post-processing module 88 may be configured to execute a post-processing script after at least one of the executable objects 66 is executed. In response to executing the post-processing script, the log post-processing module 88 is configured to verify that the executable object 66 was properly executed. The log aggregation module 86 is configured to consolidate different log formats, thereby enabling the operator to analyze, search, and report the operational characteristics of the DCM 20.

The SATA script interpreter 90 is configured to read and execute executable objects 66 that are implemented by a script. In one embodiment, the SATA script interpreter 90 may be implemented by the Python® Script Runner. Alternatively, the SATA script interpreter 90 may be replaced with a JIT compiler for compilation and execution of executable objects 66 that include other source code formats. In other embodiments the SATA 80 may include both the SATA script interpreter 90 and the JIT compiler for executing various types of executable objects 66. The VVSA communication API 92 enables the SATA 80 and the VVSA 100 to communicate information and enables the SATA 80 to control the various modules of the VVSA 100 via the SATA GUI 82. The TSP communication API 94 enables the SATA 80 to transmit HTTP requests the data server 120 and the voice server 140 and receive HTTP responses from the data server 120 and the voice server 140.

The VVSA 100 includes, but is not limited to, a VVSA GUI 102, a communication bus 103, an external communication API 104, a field programmable gate array (FPGA) and relay module 105, a radio frequency (RF) module 106, an audio module 108, a logging module 110, a USB module 112, a flash enable module 114, a controller area network (CAN) logging module 116, and a debug logging module 118.

The VVSA GUI 102 includes a plurality of graphical elements for manually controlling the signals transmitted from the plurality of hardware devices to the DCM 20. As an example, in response to selecting a button on the VVSA GUI 102 corresponding to performing a manual test of FPGA and relay circuits 158, the VVSA 100 may selectively activate or deactivate, using the FPGA and relay module 105, signals transmitted from the FPGA and relay circuits 158 to the DCM 20. Additionally, if the operator is performing an automated test of the DCM 20 via the SATA 80, the VVSA GUI 102 is configured to indicate the type of test the VVSA 100 is executing based on the executable object 66. As an example, if the SATA 80 is executing a script that causes the VVSA 100 to activate the audio module 108, the VVSA GUI 102 may indicate that the audio module 108 is currently activated by, for example, graying out a button on the VVSA GUI 102 associated with the audio module 108.

The communication bus 103 is configured to provide a communication link between the VVSA GUI 102, the FPGA and relay module 105, the RF module 106, the audio module 108, the logging module 110, the USB module 112, and the flash enable module 114.

The external communication API 104 provides an interface for the SATA 80 to control the FPGA and relay module 105, the RF module 106, the audio module 108, the logging module 110, the USB module 112, and/or the flash enable module 114 of the VVSA 100. As an example, the external communication API 104 enables the SATA 80 to execute a script that causes the RF module 106 to activate the RF attenuators 154.

Additionally, the external communication API 104 may provide an interface for a central command module 150 to control the FPGA and relay module 105, the RF module 106, the audio module 108, the logging module 110, the USB module 112, and/or the flash enable module 114. The central command module 150 may be configured to selectively activate various modules of a plurality of DCM test bench systems 72. As an example, using the central command module 150, an operator may simultaneously and remotely activate the RF module 106 of five DCM test bench systems 72.

The RF module 106 is configured to control the RF attenuators 154, which are electrically coupled to RF antennas 156. Each of the RF antennas 156 may correspond to different telematics services provided by the DCM 20. The RF attenuators 154 are configured to, in response to being activated by the RF module 106, reduce the detectable signal strength of each of the telematics services of the DCM 20. In other embodiments, the RF attenuators 154 may be selectively activated by the FPGA and relay module 105.

Once the signal of the corresponding telematics service system is attenuated by the RF attenuator 154, an RF shield container 152 prevents a parasitic signal from affecting the operation of the DCM 20 during a testing procedure.

As an example, a first antenna of the RF antennas 156 may correspond to a main cellular antenna (Tel Main), which is a part of a multiple-input, multiple-output (MIMO) antenna configuration (e.g., 2×2 MIMO, 4×4 MIMO, 8×8 MIMO); a second antenna of the RF antennas 156 may correspond to a secondary cellular antenna (Tel Sub) that also is a part of a MIMO antenna configuration; and a third antenna of the RF antennas may correspond to a GNSS. Furthermore, in response to the RF module 106 activating an RF attenuator 154 associated with the main cellular antenna, the detectable signal strength during a testing period associated with the main cellular antenna may be very low in order to simulate the DCM 20 operating without cellular service (e.g., −120 dBM). In other embodiments, different units representing the signal strengths may be utilized, such as a received signal strength indicator (RSSI), a reference signal received quality (RSRQ), a signal-to-noise ratio (SNR), etc. By activating the RF attenuators 154 via the RF module 106, the SATA 80 and/or the VVSA 100 may simulate or test how the DCM 20 responds when, for example, the DCM 20 has no cellular service or the DCM 20 is executing an emergency call and the vehicle 10 subsequently passes through an area with no cellular service.

The FPGA and relay module 105 is configured to control the FPGA and relay circuits 158, which are coupled to the DCM 20 via an interface (I/F) board 164. Using the FPGA and relay module 105 and the FPGA and relay circuits 158, the operator can transmit signals to the DCM 20 that represent signals transmitted by various components of the vehicle 10. As an example, a first relay of the FPGA and relay circuits 158 may be configured to, in response to being selectively activated by the FPGA and relay module 105, electrically couple a 12 Volt DC source (not shown) to the DCM 20, wherein the signal generated by the 12 Volt DC source represents a signal transmitted from a battery of the vehicle 10 to the DCM 20. As another example, an FPGA of the FPGA and relay circuits 158 may be configured to, in response to being selectively activated by the FPGA and relay module 105, output a square wave signal, a sinusoidal signal, or other similar signal to the DCM 20. The square wave signal may represent, for example, a signal outputted by an airbag sensor (not shown) of the vehicle 10 in response to the airbag sensor indicating that the airbag was deployed.

The FPGA and relay circuits 158 may be implemented by an FPGA and at least one relay that is physically distinct from the computing device 60. In other embodiments, the FPGA and relay circuits 158 may be implemented by at least one peripheral component interconnect express (PCIe) card that is located within the computing device 60. Furthermore, the FPGA and relay circuits 158 may be programmed using various types of commercial software for programming FPGAs and/or relays, such as LabVIEW FPGA Module provided by National Instruments, Inc. In other embodiments, the FPGA and relay circuits 158 may be replaced with a programmable logic device (PLD).

The audio module 108 is configured to control a speaker 160, which is coupled to the DCM 20 via the I/F board 164. Additionally, the audio module 108 is configured to record and/or playback audio signals. Using the audio module 108 and the speaker 160, the operator can transmit signals to the DCM 20 that represent modulated audio signals received by the DCM 20 in order to test whether the DCM 20 can properly receive and process modulated audio signals in various scenarios.

The logging module 110 is configured to analyze data generated during the execution of a manual testing procedure or an automated testing procedure. The logging module 110 may be in communication with a CAN logging module 116 and a debug logging module 118 for analyzing CAN bus data and data logs, respectively, during a testing procedure. In other embodiments, the logging module 110 may be configured to analyze Ethernet bus data.

The USB module 112 is configured to transmit signals to the DCM 20 that represent signals transmitted from a device connected to a USB port of the vehicle 10 to the DCM 20. As an example, in response to selectively activating the computing device 60, the computing device 60 is configured to provide a 5 Volt DC signal to the DCM 20.

The flash enable module 114 is configured to set the DCM 20 into a flash mode, thereby allowing the operator to update the software of the DCM 20.

Figure 4:
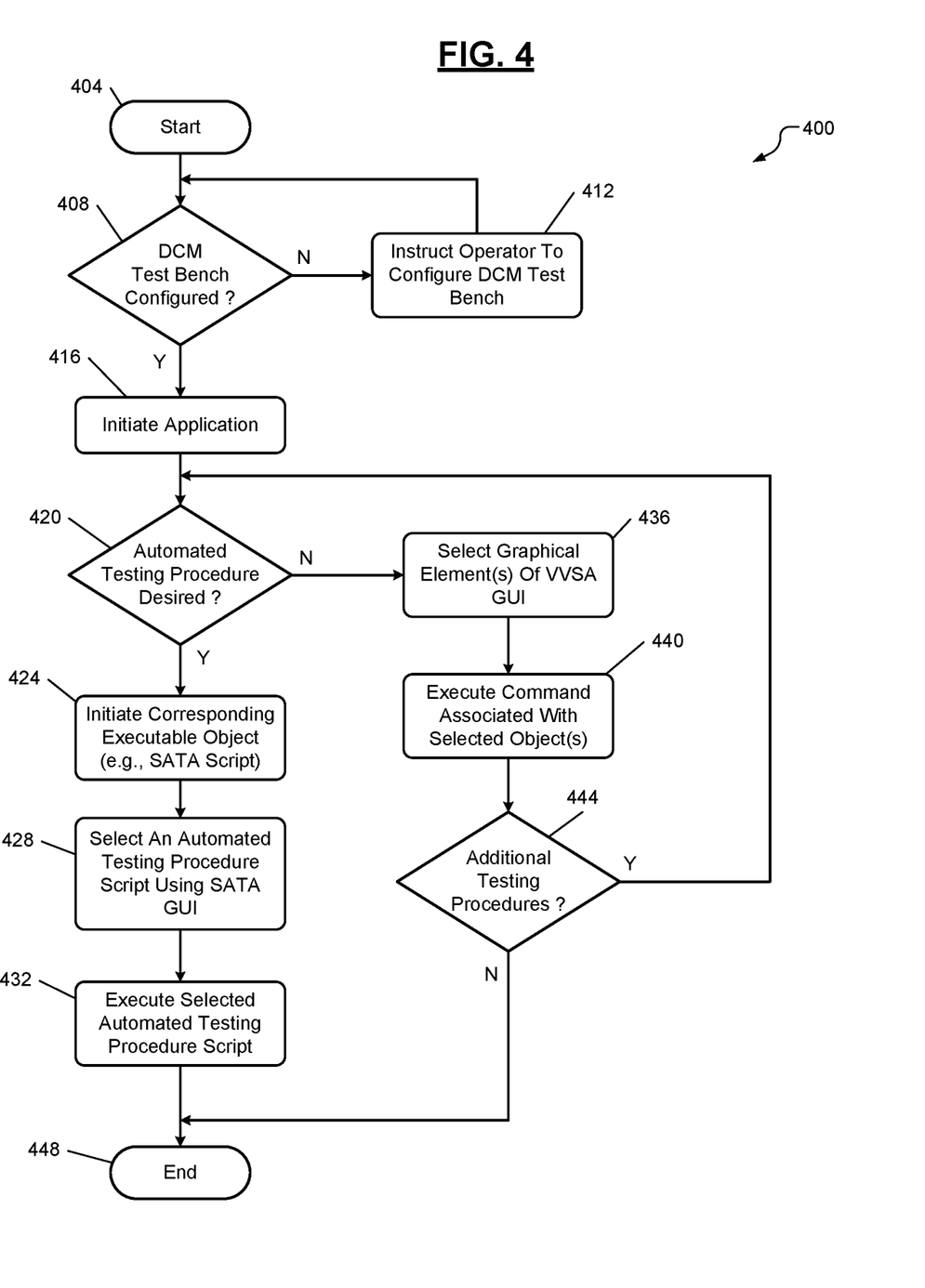
FIGS. 4-5 illustrate flowcharts of example control algorithms according to the present disclosure.

With reference to FIG. 4, a flowchart illustrating an example control algorithm 400 for testing the DCM 20 is shown. The control algorithm 400 begins at 404 when, for example, an operator turns on the computing device 60. At 408, the control algorithm 400 determines, using the computing device 60, whether the DCM test bench system 72 is configured. As an example, the control algorithm 400 may determine whether the DCM 20 is properly coupled to the computing device 60 via the I/F board 164. Furthermore, the control algorithm 400 may determine whether the RF attenuators 154, the RF antennas 156, the FPGA and relay circuits 158, and the speaker 160 are properly coupled to the computing device 60 and/or the I/F board 164. If the DCM test bench system 72 is properly configured, the control algorithm 400 proceeds to 416; otherwise, the control algorithm 400 proceeds to 412.

At 412, the control algorithm 400 instructs, using the computing device 60, the operator to configure the DCM test bench system 72 and then proceeds to 408. As an example, the computing device 60, using one of the SATA GUI 82 and the VVSA GUI 102, may provide a prompt to the operator illustrating an improper connection or incomplete setup of the DCM test bench system 72. At 416, the control algorithm 400 initiates, using the computing device 60, the application 68. At 420, the control algorithm 400 determines, based on an input received by the computing device 60 from the operator, whether the operator desires to execute a manual testing procedure or an automated test procedure. If the control algorithm 400 determines to execute an automated testing procedure based on the input, the control algorithm 400 proceeds to 424; otherwise, the control algorithm 400 proceeds to 436.

At 424, the control algorithm 400 initiates, using the computing device 60, the corresponding executable object 66 (e.g., a SATA script for launching the SATA 80). As an example, the application 68 may execute the Python® script corresponding to the SATA 80 in order to display the SATA GUI 82. At 428, the control algorithm 400 selects, based on an input received by the computing device 60 from the operator, an automated testing procedure script using the SATA GUI 82. As an example, the operator may select a predefined automated testing procedure Python® script from a library of locally and/or remotely stored automated testing procedure Python® scripts. Alternatively, the operator may generate a new automated testing procedure Python® script for subsequent execution by SATA 80. At 432, the control algorithm 400 executes, using the computing device 60, the automated testing procedure script and then proceeds to 448. As an example, the operator may select a button on the SATA GUI 82 corresponding to the initialization of the execution of the automated testing procedure Python® script.

At 436, the control algorithm 400 receives a selection of at least one graphical element (e.g., a button) of the VVSA GUI 102. At 444, the control algorithm 400 executes, using the computing device 60, a command associated with the selected at least one objects. At 448, the control algorithm 400 determines whether additional testing procedures need to be executed. If so, the control algorithm 400 proceeds to 420; otherwise, the control algorithm 400 proceeds to 448 and then ends.

Figure 5:
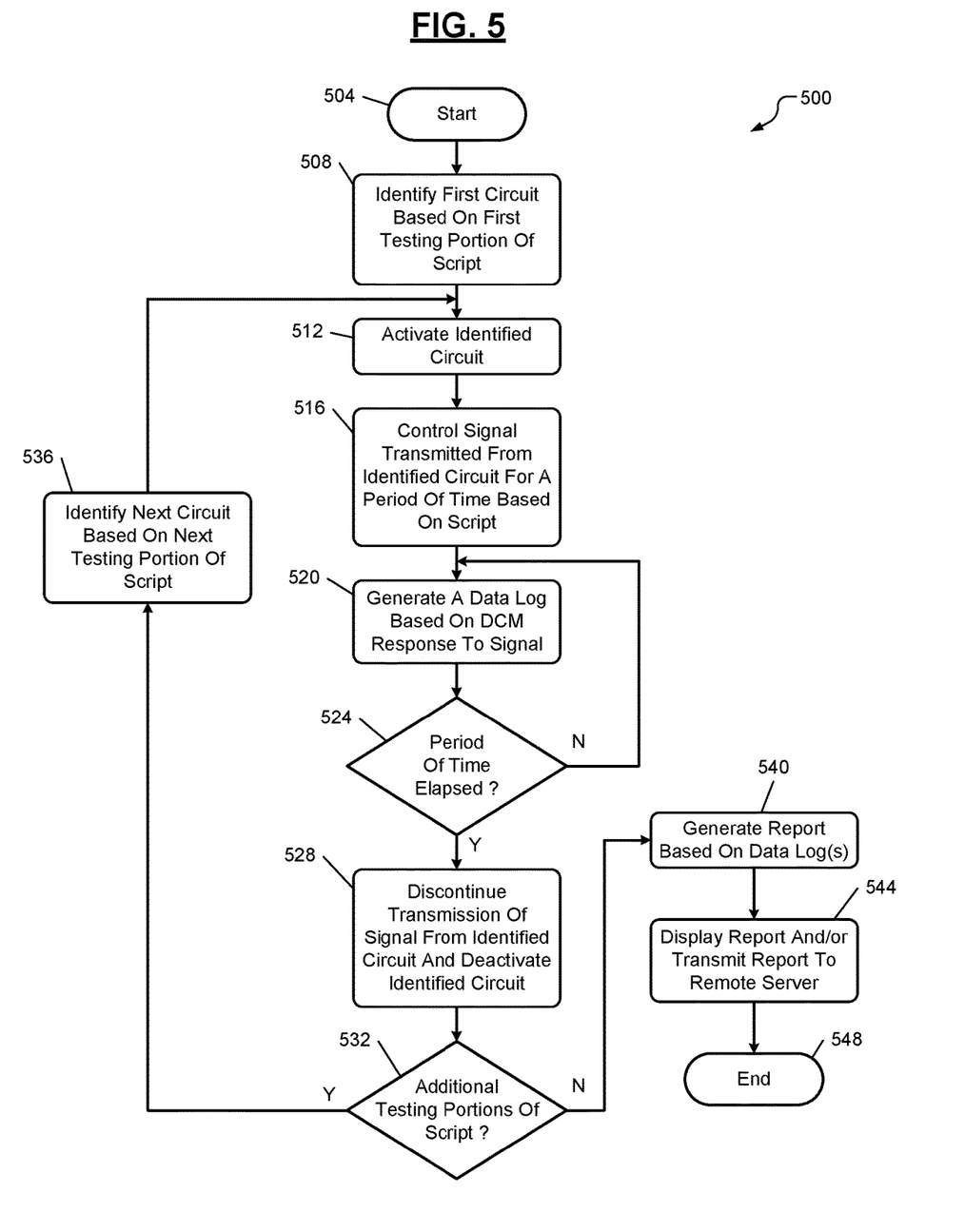

With reference to FIG. 5, a flowchart illustrating an example control algorithm 500 for executing a testing procedure is shown. The control algorithm 500 may be utilized for executing both manual testing procedure scripts and automated testing procedure scripts. The control algorithm 500 begins at 504 when, for example, the computing device 60 is turned on. At 508, the control algorithm 500 identifies, using the processor 62, a first circuit (e.g., the RF attenuators 154, the FPGA and relay circuits 158, the speaker 160, etc.) based on a first testing portion of the script. At 512, the control algorithm 500 activates the identified circuit using one of the modules corresponding to the identified circuit. At 516, the control algorithm 500 controls the signal transmitted from the identified circuit for a period of time based on the script. The period of time may correspond to an amount of time the operator desires to execute the manual or automated testing procedure. At 520, the control algorithm 500 generates, using the logging module 110, a data log based on the DCM's 20 response to the signal. At 524, the control algorithm 500 determines whether the period of time has elapsed. If so, the control algorithm 500 proceeds to 528; otherwise, the control algorithm 500 proceeds to 520.

At 528, the control algorithm 500 discontinues the transmission of the signal from the identified circuit and deactivates the identified circuit. At 532, the control algorithm 500 determines, using the processor 62, whether there are additional testing portions of the script that need to be executed. If so, the control algorithm 500 proceeds to 536; otherwise, the control algorithm 500 proceeds to 540. At 536, the control algorithm 500 identifies, using the processor 62, the next testing portion of the script and then proceeds to 512. At 540, the control algorithm 500 generates, using the processor 62, a report based on the data logs. The report is configured to provide information corresponding to the results of the manual or automated testing procedure. At 544, the control algorithm 500 displays the report and/or transmits the report to the data server 120 and/or the voice server 140. At 548, the control algorithm 500 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a data communication module (DCM) test bench system configured to test a DCM of a vehicle, the DCM test bench system including a computing device having a processor configured to execute instructions stored in a nontransitory computer-readable medium, wherein the instructions include:
receiving, using the processor, a selection from an operator of the DCM test bench system indicating one of a manual DCM test procedure and an automated DCM test procedure;
in response to the received selection indicating the manual DCM test procedure:
generating, with the processor, a graphical user interface including a plurality of graphical elements each associated with a hardware device of a plurality of hardware devices of the DCM test bench system, the plurality of hardware devices being controlled by the processor;
receiving, with the processor, a first manual input from the operator of the DCM test bench selecting a particular graphical element from the plurality of graphical elements; and
controlling, with the processor, the hardware device associated with the particular graphical element to generate and transmit a manually controlled signal to an electronic control unit (ECU) of the DCM of the vehicle;
in response to the received selection indicating the automated DCM test procedure:
receiving, with the processor, a second manual input from the operator of the DCM test bench selecting a predefined automated testing procedure script; and
executing, with the processor, the predefined automated testing procedure script and controlling at least one hardware device of the plurality of hardware devices to generate and transmit a plurality of automatically controlled signals to the ECU of the DCM of the vehicle based on the execution of the predefined automated testing procedure script;
generating, using the processor, a data log, wherein the data log indicates first operating characteristics of the ECU of the DCM of the vehicle in response to receiving the manually controlled signal when the manual DCM test procedure is selected and indicates second operating characteristics of the ECU of the DCM of the vehicle in response to receiving the automatically controlled signals when the automated DCM test procedure is selected; and
generating, using the processor, a report based on the data log;
wherein the manually controlled signal and the plurality of automatically controlled signals generated by the plurality of hardware devices each simulate one of (i) a signal transmitted by the vehicle and (ii) a signal received from a communications system.

2. The system of claim 1, wherein the ECU configured to execute telematics operations.

3. The system of claim 1, wherein the plurality of hardware devices includes at least one of a relay, a field programmable gate array (FPGA), and a peripheral component interconnect express (PCIe) card.

4. The system of claim 1, wherein the plurality of hardware devices includes at least one of a programmable logic device (PLD), a radio frequency attenuator circuit, an audio circuit, and a universal serial bus (USB) interface circuit.

5. The system of claim 1, wherein the instructions further include transmitting, using the processor, the report to a remote server.

6. A method comprising:
receiving, using a processor, a selection from an operator of a data communication module (DCM) test bench system indicating one of a manual DCM test procedure and an automated DCM test procedure, the DCM test bench system being configured to test a DCM of a vehicle, and the DCM test bench system including a computing device having the processor;
in response to the received selection indicating the manual DCM test procedure:
generating, with the processor, a graphical user interface including a plurality of graphical elements each associated with a hardware device of a plurality of hardware devices of the DCM test bench system, the plurality of hardware devices being controlled by the processor;
receiving, with the processor, a first manual input from the operator of the DCM test bench selecting a particular graphical element from the plurality of graphical elements; and
controlling, with the processor, the hardware device associated with the particular graphical element to generate and transmit a manually controlled signal to an electronic control unit (ECU) of the DCM of the vehicle;
in response to the received selection indicating the automated DCM test procedure:
receiving, with the processor, a second manual input from the operator of the DCM test bench selecting a predefined automated testing procedure script; and
executing, with the processor, the predefined automated testing procedure script and controlling at least one hardware device of the plurality of hardware devices to generate and transmit a plurality of automatically controlled signals to the ECU of the DCM of the vehicle based on the execution of the predefined automated testing procedure script;
generating, using the processor, a data log, wherein the data log indicates first operating characteristics of the ECU of the DCM of the vehicle in response to receiving the manually controlled signal when the manual DCM test procedure is selected and indicates second operating characteristics of the ECU of the DCM of the vehicle in response to receiving the automatically controlled signals when the automated DCM test procedure is selected; and
generating, using the processor, a report based on the data log;
wherein the manually controlled signal and the plurality of automatically controlled signals generated by the plurality of hardware devices each simulate one of (i) a signal transmitted by the vehicle and (ii) a signal received from a communications system.

7. The method of claim 6, wherein the ECU is configured to execute telematics operations.

8. The method of claim 6, wherein the plurality of hardware devices includes at least one of a relay, a field programmable gate array (FPGA), and a peripheral component interconnect express (PCIe) card.

9. The method of claim 6, wherein the plurality of hardware devices includes at least one of a programmable logic device (PLD), a radio frequency attenuator circuit, an audio circuit, and a universal serial bus (USB) interface circuit.

10. The method of claim 6, further comprising transmitting, using the processor, the report to a remote server.

* * * * *

UNITED STATES PATENT AND TRADEMARK OFFICE
CERTIFICATE OF CORRECTION

PATENT NO. : 11,107,308 B2
APPLICATION NO. : 16/110383
DATED : August 31, 2021
INVENTOR(S) : Sorin Mihaltan et al.

It is certified that error appears in the above-identified patent and that said Letters Patent is hereby corrected as shown below:

In the Claims

Column 13, Line 66: In Claim 2, after "ECU", insert --is--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*